United States Patent [19]

Ayres et al.

[11] 4,256,920

[45] Mar. 17, 1981

[54] RE-ENTERABLE DUCT SEAL

[75] Inventors: Rand K. Ayres; Hassan A. Sherif, both of Ottawa, Canada

[73] Assignee: Northern Telecom Limited, Montreal, Canada

[21] Appl. No.: 31,309

[22] Filed: Apr. 18, 1979

[51] Int. Cl.[3] .............................................. H02G 3/22
[52] U.S. Cl. .................. 174/65 R; 174/151; 174/23 R; 248/56
[58] Field of Search ............... 174/18, 23 R, 65 R, 174/65 SS, 151; 277/4, 12; 248/56

[56] References Cited

U.S. PATENT DOCUMENTS

| | | | |
|---|---|---|---|
| 1,460,698 | 7/1923 | Berry | 174/65 SS |
| 1,851,940 | 3/1932 | Williams | 174/23 R X |
| 2,276,969 | 3/1942 | Heinichen | 277/4 |
| 3,347,974 | 10/1967 | Arendt | 174/23 R |
| 3,970,783 | 7/1976 | Lukas | 174/70 R X |

FOREIGN PATENT DOCUMENTS

| | | | |
|---|---|---|---|
| 1373304 | 8/1964 | France | 248/56 |
| 1026392 | 4/1966 | United Kingdom | 285/158 |

Primary Examiner—Gerald P. Tolin
Assistant Examiner—D. A. Tone

[57] ABSTRACT

A re-entrable duct is provided through which a cable is adapted to penetrate a wall, e.g., of an environmentally controlled manhole. The re-entrable duct includes a duct pipe, e.g., a length of steel pipe, through which the cable passes. A resilient annular plug having a central aperture through which the cable passes, e.g., a so-called split rubber duct plug, is situated at each end of the duct pipe. The annular plugs with the duct pipe define a sealant chamber. A quantity of bentonite is provided which substantially fills the sealant chamber. A sleeve is secured to one end of the duct pipe adjacent one such split rubber duct plug, that sleeve including an end plate having a central aperture therethrough which the cable passes. The cable is thus secured within the central aperture in a circumferential, hermetic sealed manner, thereby defining a secondary sealed air chamber between the split rubber duct plug and the end plate. Finally, a crimpable tube is disposed within, and projects from the central aperture in the end plate, and is crimped into hermetically sealed contact onto the cable. Together, the three components of the re-entrable duct seal provide a three-stage seal against moisture and at least a one-stage seal against gas. All components can be re-entered if necessary, and all may be placed from one end of the steel duct pipe only.

20 Claims, 1 Drawing Figure

U.S. Patent
Mar. 17, 1981
4,256,920
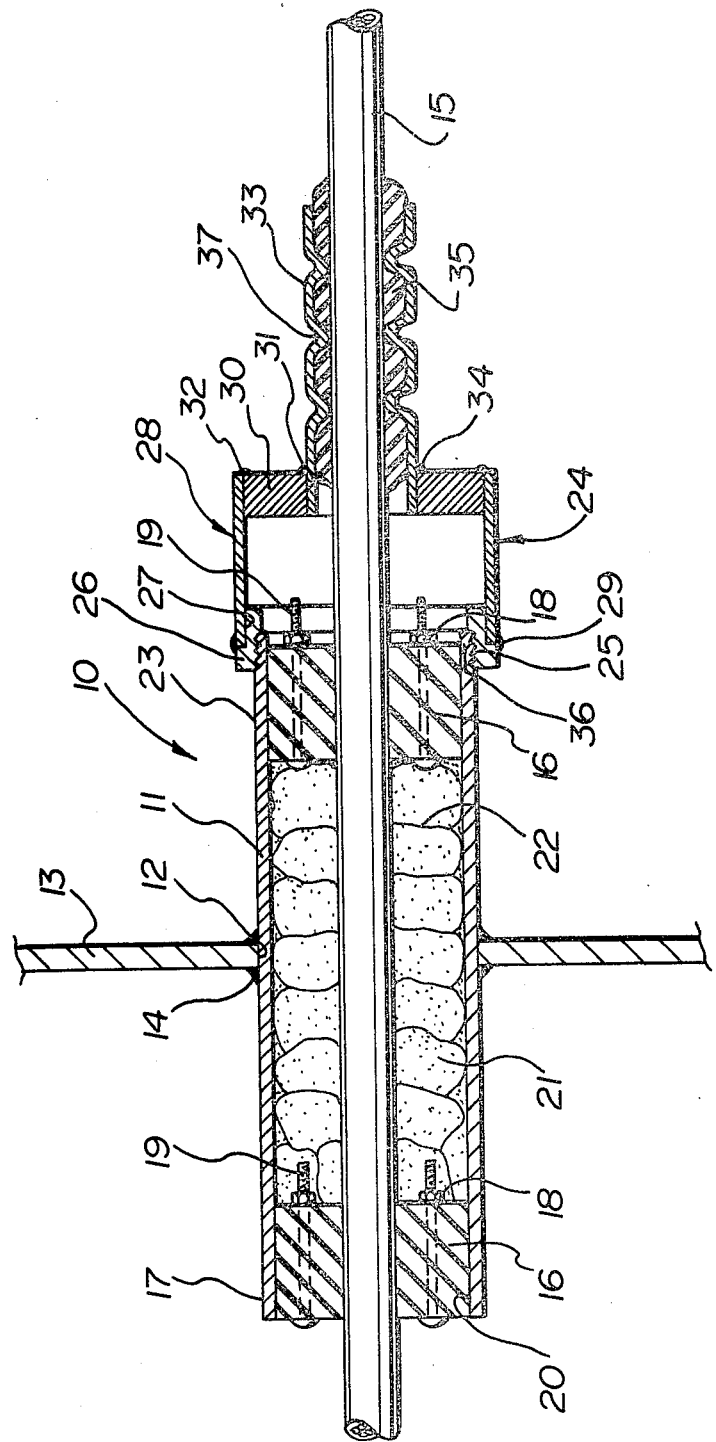

RE-ENTERABLE DUCT SEAL

BACKGROUND OF THE INVENTION (i) Field of the Invention

This invention relates to a re-entrable duct seal which protects against the passage of water through the duct and especially of the re-entrable duct seal for use with an environmentally-controlled manhole to protect against the passage of water and gas through the duct.

(ii) Description of the Prior Art

A re-entrable duct provided with a seal may be used in any instance where it is desired to penetrate a wall and yet provide a water-tight and preferably also a gas-tight re-entrable seal. In one preferred use, it is adapted for use on an environmentally-controlled manhole, which is a structure intended as an underground housing for electronic switching equipment. The duct seal is provided to allow telephone cable to enter the environmentally-controlled manhole without allowing ingress of water and also, preferably, of gas.

Current duct sealing methods have not been completely successful. Usually, sealing compounds are used to encapsulate cables in the conduits. The compounds typically take many hours to set up and often do not seal properly when placed in wet ducts. Such existing compounds often leak and are thus considered unacceptable for use in such environmentally-controlled manholes.

SUMMARY OF THE INVENTION (i) Aims of the Invention

An object, then, of this invention is to provide duct sealing means which ensure substantial water tightness.

Another object of this invention is to provide such duct sealing means which is also substantially gas tight.

A further object of this invention is to provide such a duct sealing means which permits re-entry into the ducts at a later time if necessary.

(ii) Statements of Invention

By this invention, a re-entrable duct is provided, through which a cable is adapted to penetrate a wall, comprising: (a) a duct pipe through which the cable is adapted to pass, the duct pipe being adapted to be secured to an aperture in the wall; (b) a resilient split rubber duct plug adapted to be disposed at each end of the duct pipe, the cable being adapted to pass through a central aperture in each of the split rubber duct plugs, the split rubber plugs being provided with manually operable means to act on the central aperture, whereby the central aperture is adapted hermetically, sealingly, and circumferentially to engage the cable, the annular plugs and the duct pipe defining a primary sealant chamber therebetween; (c) a quantity of bentonite adapted substantially to fill the primary sealant and to surround the cable; (d) a sleeve, adapted to be secured to one end of the duct pipe adjacent one such split rubber duct plug, the sleeve including an end plate having a central aperture therethrough through which the cable is adapted to pass, the cable being adapted to be secured within the central aperture in a circumferential hermetic sealed manner, thereby defining a secondary sealed air chamber between the split rubber duct plug and the end plate; and (e) a crimpable tube disposed within and projecting from the central aperture in the end plate, and adapted to be crimped into hermetically sealed contact onto the cable.

This invention also provides, in combination, a re-entrable duct, a wall having a hole therethrough, and a cable secured within the duct, comprising: (a) a duct pipe through which the cable passes, said duct pipe being secured to the hole in the wall; (b) a resilient split rubber duct plug at each end of the duct pipe, the cable passing through a central aperture in each of the split rubber duct plugs and being secured within each of those apertures in an hermetically sealed and circumferential engagement, the annular plugs and the duct pipe defining a primary sealant chamber therebetween; (c) a quantity of bentonite substantially fillint said primary sealant chamber and surrounding the cable; (d) a sleeve secured to one end of the duct pipe adjacent one of the split rubber duct plugs, the sleeve including an end plate having a central aperture therethrough through which the cable passes, said cable being secured within that central aperture in a circumferential hermetic sealed manner, thereby defining a secondary sealed air chamber between the split rubber duct plug and the end plate; and (e) a tube disposed within and projecting from the central aperture in the end plate, said tube being crimped into hermetically sealed engagement onto the cable.

(iii) Other Features of the Invention

By one further feature thereof, the resilient annular plug comprises a split rubber duct plug.

By another further feature, the rubber out of which the split rubber duct plug is formed is neoprene, the generic name of an elastomer based in chloroprene.

By another feature, the filler material comprises bentonite which is in the form of compressed pellets.

By a further feature thereof, the bentonite is tamped into the sealant chamber.

By another further feature thereof, the bentonite is packed in a plurality of rupturable bags e.g., of paper.

By yet another feature, the sheath, the annular end plate, and the crimpable tube are formed of lead.

By yet another feature, the pipe cap is secured to the one end of the duct by threaded engagement.

By another feature, the duct pipe is a length of steel tubing.

(iv) Generalized Description of the Invention

In its broadest sense, the seal for the duct, to provide water impermeability, includes the pair of spaced-apart annular resilient, e.g., split rubber, duct plugs, one at each end of the duct pipe, and the filler material. To provide even greater protection against water and to provide gas impermeability, a crimpable pipe cap is also provided.

The resilient annular plugs, e.g. split rubber duct plugs, are conventional. The rubber out of which these plugs may be formed include neoprene, chloroprene rubber and Silastic (registered Trade Mark) silicone rubber. These plugs, when properly installed, as will be described hereinafter, serve as a primary seal against moisture. It has been found that the resilient material may relax with time and thus become less effective as a seal. However, the plugs initially substantially prevent water from entering the duct while the other components of the seal are placed. Moreover, plugs are essential for confining the filler material, e.g., the bentonite clay, in the duct.

The filler material is generally a hydrophilic material which has the characteristic of absorbing water to provide a substantially water-impermeable gel. The preferred filler material is bentonite, which is a natural volcanic clay. It is readily commercially available. An example of such bentonite is the compressed bentonite pellets known by the Trade Mark of PELTONITE by Roctest Limited. The bentonite acts as an effective seal against moisture. As the water enters the bentonite, the clay swells to form a waterproof gel. The clay is capable of swelling to seven times its dry volume.

Another example of a suitable such material is that known by the Trade Mark of PROTECTOLITE, which is a very finely divided material whose surface tension with respect to water is greater than the capillary force of water, and so acts as a water repellent.

Another type of such filler material is disclosed in Canadian Pat. No. 1,005,868 issued Feb. 22, 1977 to Northern Electric Co. Ltd. and is a mixture of a hydrophobic powder and a hydrophilic powder, the hydrophilic powder forming on contact with water, a viscous non-swelling material. When such filler is used, the exposed surfaces of the duct and of the cable which are in contact with the powders should be coated with a hydrophobic oil, preferably a low viscosity paraffinic oil. The hydrophobic powder may be a long chain fatty acid coated carbonate, e.g. that sold under the Trade Marks PROTAXULATE and PROTEX E by Pleuss-Stauffer AG, France, and the hydrophilic powder may be a high molecular weight polyacrylamide, e.g., that sold under the Trade Marks SEPARAN of Dow Chemical Corp. and MAGNIFLOC of Cyanamid Company. The percentage of hydrophobic powder to hydrophilic powder is generally 92:8 to 70:30% by weight. It is generally not necessary using this filler to fill the chamber, since because of the nature of the reaction of the filler to the ingress of water an amount greater than 50% is sometimes sufficient.

Another type of such filler material is disclosed in Canadian Pat. No. 1,011,836 issued June 7, 1977 to Northern Telecom Ltd. and is a mixture of water-repellent treated calcium carbonate and at least one high molecular weight resin rapidly hydratable to form a viscous solution. Examples of suitable such water-repellent treated calcium carbonate and such high molecular weight resin rapidly hydratable to form a viscous solution are the same as those described above in referring to Canadian Pat. No. 1,005,868. The percentages of hydrophobic powder to hydrophilic powder may range from 95–70:5–30% by weight. The fatty acid may be lauric, myristic, palmitic, stearic or arachidic acids. The resin may be an anionic polyacrylamide resin having an average molecular weight between $2.5 \times 10^6$ and $7 \times 10^6$ and with between 12 and 28% acrylamide groupings which have been chemically converted to acrylic acid groupings. Alternatively, it may be a polyacrylamide resin which has been cross-linked by irradiation, or polyethylene oxide which has been cross-linked by irradiation, or a hydrolyzed starch graft polymer of polyacrylonitrile.

Other examples of powdered fillings which react with water to form water blockage materials include those disclosed in U.S. Pat. No. 3,538,235 issued Nov. 3, 1970 to Arendt, and U.S. Pat. No. 3,803,339 issued Apr. 9, 1974 to Speekman.

The crimpable pipe cap acts not only as a third seal against moisture, but also as a seal against entry of gas. The crimpable pipe cap seal can retain 15 psi air pressure, without leakage, for three months. While lead is the preferred material for such crimpable pipe cap, other materials, e.g., aluminum or steel, may be used.

The crimpable connection to a cable is disclosed in U.S. Pat. No. 3,970,783 issued July 20, 1976 to Northern Electric Company, Limited. As taught in that patent, a lead sleeve is crimped over the cable, with the outer sheath being just roughened and a layer of sealing compound between the lead sleeve and the outer protective sheath of the cable. A tube provides a close fit over the lead sheath and the outer end of the tube is soldered to the assembly. The sealing compound may be a sealing tape wrapped around the cable. A heat shrinkable plastic tube may be shrunk over the lead sleeve to form a sheating which provides an additional seal and corrosion protection at the position where the lead sleeve meets the metal tube.

BRIEF DESCRIPTION OF THE DRAWINGS

The single FIGURE of drawings herein is a central longitudinal section through a typical re-entrable duct seal of one aspect of this invention.

DESCRIPTION OF PREFERRED EMBODIMENT

As seen therein, the re-entrable duct 10 includes a duct tube 11 preferably formed of stainless steel, passing through an aperture 12 in the wall 13 of an environmentally-controlled manhole. The duct 15 is passed through the duct tube 11, and a split rubber duct plug 16 is provided at the exterior end 17 of the duct tube. As is common practice, the split rubber duct plug 16 is placed around the cable 15 and tightening of the nuts 18 on the bolts 19 squeezes the rubber together, thus providing a secure circumferential seal with the interior surface 20 at the end 17 of the duct tube 11 and also a pinching seal around the cable 15. A mass of suitable filler material 21, e.g., bentonite, is tamped into the interior of the duct tube 11 around the cable 15 from the interior of the environmentally-controlled manhole. This may suitably be accomplished by loading the bentonite into paper bags 22 which are broken to expose the bentonite once in place. Once the bentonite 21 substantially fills the interior of the duct tube 11 around the cable 15, a second split rubber duct plug 16 is placed within the duct tube 11 around the cable 15 at the interior end 23 thereof, in the same manner as has been described hereinbefore.

A crimpable pipe cap 24 is associated with the duct tube. The crimpable pipe cap 24 includes a lead nipple 26 having a circumferential recess 27 therein and provided with internal threads 25 thereon. An outer lead sleeve 28 is placed over recess 27 and is soldered thereon at 29. An end ring 30 formed of lead and having a central aperture 31 is secured within outer lead sleeve 28 by soldering at 32. An inner lead sleeve 33 is secured to the aperture 31 by soldering at 34.

The interior end of the cable 15 is provided with a sealing composition 35 thereon, preferably in the form of sealing tape. The crimpable pipe cap 24 is disposed around the cable 15 so that the sealing compound 35 is under the inner lead sleeve 33, with the threads 25 engaging threads 36 at the end of the duct tube 11. Then the inner lead sleeve is crimped at 37 to provide a watertight and gas-tight seal around cable 15.

OPERATION OF PREFERRED EMBODIMENT

One convenient manner of installing the duct seal is described as follows:

The duct tubes are normally provided with pipe caps until they are ready for use. The pipe cap is first removed from the duct tube. The crimpable pipe cap is slipped over the end of the cable as the cable is brought into the environmentally-controlled manhole. After the required length of cable has been brought into the environmentally-controlled manhole, the first split rubber duct plug is placed in the duct tube. The split rubber duct plug is pushed to the back of the duct tube and then expanded by tightening the nuts on the plug. Small paper bags are loaded ¼ to ½ full with bentonite. The bags of bentonite are placed in the duct tube in layers so that they completely surround the cable. As each layer of bentonite is placed in the duct tube, the bags are tamped and then broken so that the bentonite flows into the duct tube. The next layer of bentonite is then pushed into the duct tube and the process is repeated until only the space required by the second split rubber duct plug remains.

The paper bags should be thoroughly broken (almost shredded) after being placed in the duct tube so that the bentonite is unconfined by the paper. The paper bags are used to make handling of the bentonite convenient and if not properly broken, they could impair the effectiveness of the bentonite.

After the duct tube has been filled with bentonite, the second split rubber duct plug is placed in position. The plug should be pressed against the bentonite so that the bentonite is compressed. The nuts on the plug are then tightened.

The cable sheath, e.g., of polyethylene, is abraded, e.g., with emery cloth in the area that will be wrapped with the sealing compound, e.g., "B" sealing tape. The "B" sealing tape is wrapped around the cable, e.g. with a ¾ overlapping wrap. Sufficient tape is placed around the cable so that the crimpable cap will just fit over the tape. Enough clearance is left between the tape and the cap so that the cap can be screwed onto the duct without grabbing the tape and twisting the cable. The crimpable pipe cap is screwed onto the duct tube and then tightened. Vinyl tape is wrapped around the exterior of the small lead sleeve. The tape prevents the crimping tool from gouging the sleeve during the crimping process. The sleeve is then crimped.

The two essential components of the re-entrable duct seal, i.e., the resilient annular plugs and the bentonite, provide primary protection against the ingress of water; together, the three components of the re-entrable duct seal, i.e. the two components above-described and the crimped seal, provide a three-stage seal against moisture and at least a one-stage seal against gas. All components can be re-entered if necessary, and all may be placed from one end of the steel duct only. For example, in the environmentally-controlled manhole application, the ducts may be all sealed from the interior of the environmentally-controlled manhole.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. A re-entrable duct through which a cable is adapted to penetrate a wall, said wall having an aperture therethrough, said duct comprising:

(a) a duct pipe through which said cable is adapted to pass, said duct pipe being adapted to be secured within said aperture in said wall;
(b) a resilient split rubber duct plug disposed at each end of said duct pipe, said cable being adapted to pass through a central aperture in each of said split rubber duct plugs, each of said split rubber plugs being provided with manually operable means to act on said central aperture, whereby each said central aperture is adapted hermetrically sealingly and circumferentially to engage said cable, said annular plugs and said duct pipe defining a primary sealant chamber therebetween;
(c) a quantity of bentonite substantially filling said primary sealant chamber and adapted to surround said cable;
(d) a sleeve secured to one end of said duct pipe adjacent one said split rubber duct plug, said sleeve including an end plate having a central aperture therethrough through which said cable is adapted to pass, said cable being adapted to be secured within said central aperture in a circumferential hermetic sealed manner, thereby defining a secondary sealed air chamber between said split rubber duct plug and said end plate; and
(e) a crimpable tube disposed within, and projecting from, said central aperture in said end plate, and adapted to be crimped into hermetically sealed contact onto said cable.

2. The re-entrable duct of claim 1 wherein said rubber out of which said split rubber duct plug is formed is neoprene.

3. The re-entrable duct of claim 1 wherein said bentonite is in the form of compressed pellets.

4. The re-entrable duct of claim 1 wherein said bentonite is tamped into said primary sealant chamber.

5. The re-entrable duct of claim 1 wherein said bentonite is packed in a plurality of rupturable bags.

6. The re-entrable duct of claim 5 wherein said rupturable bags are made of paper.

7. The re-entrable duct of claim 1 wherein said sleeve, said end plate and said crimpable tube are each formed of lead.

8. The re-entrable duct of claim 1 wherein a sealing compound is disposed around said crimpable tube between said crimpable tube and said cable prior to crimping said crimpable tube.

9. The re-entrable duct of claim 1 wherein said sleeve is secured to the said one end of said duct pipe by threaded engagement.

10. The re-entrable duct of claim 1 wherein said duct pipe is a length of steel tubing.

11. In combination, a re-entrable duct, a wall having an aperture therethrough, and a cable secured within said duct, comprising:

(a) a duct pipe through which said cable passes, said duct pipe being secured to said aperture in said wall;
(b) a resilient split rubber duct plug disposed at each end of said duct pipe, said cable passing through a central aperture in each of said split rubber duct plugs and being secured within each said aperture in a hermetically sealed and circumferential engagement, said annular plugs and said duct pipe defining a primary sealant chamber therebetween;
(c) a quantity of bentonite substantially filling said primary sealant chamber and surrounding said cable;

(d) a sleeve secured to one end of said duct pipe adjacent one said split rubber duct plug, said sleeve including an end plate having a central aperture therethrough through which said cable passes, said cable being secured within said central aperture in a circumferential hermetic sealed manner, thereby defining a secondary sealed air chamber between said split rubber duct plug and said end plate; and (e) a tube disposed within and projecting from said central aperture in said end plate, said tube being crimped in hermetically sealed engagement onto said cable.

12. The combination of claim 11 wherein said rubber out of which said split rubber duct plug is formed of neoprene.

13. The combination of claim 11 wherein said bentonite is in the form of compressed pellets.

14. The combination of claim 11 wherein said bentonite is tamped into said primary sealant chamber.

15. The combination of claim 11 wherein said bentonite is packed in a plurality of rupturable bags.

16. The combination of claim 15 wherein said rupturable bags are made of paper.

17. The combination of claim 11 wherein said sleeve, said end plate, and said crimped tube are formed of lead.

18. The combination of claim 11 wherein said crimped tube includes a sealing compound disposed between said tube and said cable.

19. The combination of claim 11 wherein said sleeve is secured to the said one end of said duct pipe by threaded engagement.

20. The combination of claim 11 wherein said duct pipe is a length of steel tubing.

* * * * *